United States Patent [19]

Weyer

[11] Patent Number: 4,881,419

[45] Date of Patent: Nov. 21, 1989

[54] FLUID-POWER BEARING ACTUATOR

[76] Inventor: Paul P. Weyer, 48811 - 284th Ave. SE., Enumclaw, Wash. 98022

[21] Appl. No.: 126,837

[22] Filed: Nov. 30, 1987

Related U.S. Application Data

[63] Continuation-in-part of Ser. No. 6,007, Jan. 20, 1987, and a continuation-in-part of Ser. No. 931,223, Nov. 14, 1986, and a continuation-in-part of Ser. No. 881,904, Jul. 3, 1986, Pat. No. 4,741,250, which is a continuation-in-part of Ser. No. 662,256, Oct. 17, 1984, Pat. No. 4,667,528, and a continuation-in-part of Ser. No. 692,293, Jan. 17, 1985, Pat. No. 4,683,767, and a continuation-in-part of Ser. No. 803,954, Dec. 2, 1985, Pat. No. 4,691,582, which is a continuation-in-part of Ser. No. 575,228, Jan. 30, 1984, Pat. No. 4,590,816.

[51] Int. Cl.$^4$ ............................................. F01B 3/08
[52] U.S. Cl. .............................. 74/89.15; 74/424.8 R; 74/441; 92/2; 92/33
[58] Field of Search .................. 74/424.8 R, 424.8 B, 74/424.8 C, 459, 409, 441, 89.15; 92/2, 31, 33

[56] References Cited

U.S. PATENT DOCUMENTS

| | | | |
|---|---|---|---|
| 717,987 | 1/1903 | Gurney | 384/504 X |
| 2,067,357 | 1/1937 | Terry | 74/424.8 R |
| 2,131,151 | 9/1938 | Smith | 74/424.8 C |
| 2,482,082 | 9/1949 | Wahlberg | 74/424.8 C |
| 2,488,256 | 11/1949 | Anderson | 74/424.8 C |
| 2,525,326 | 10/1950 | Wahlmark | 74/424.8 C |

(List continued on next page.)

FOREIGN PATENT DOCUMENTS

| | | |
|---|---|---|
| 2260300 | 6/1974 | Fed. Rep. of Germany . |
| 2803459 | 8/1979 | Fed. Rep. of Germany . |
| 2807952 | 8/1979 | Fed. Rep. of Germany . |
| 3144306 | 7/1981 | Fed. Rep. of Germany . |
| 406747 | 1/1966 | France . |
| 1496924 | 10/1967 | France . |
| 1540855 | 5/1969 | France . |
| 399084 | 10/1942 | Italy ........................... 74/424.8 C |
| 8101440 | 5/1981 | PCT Int'l Appl. ...................... 92/33 |
| 386809 | 4/1965 | Switzerland . |
| 890440 | 2/1962 | United Kingdom . |
| 1362401 | 8/1974 | United Kingdom . |

OTHER PUBLICATIONS

Spiracon brochure–Planetary roller screws, a Unique Innovation in Mechanical Linear Acruators, A 4 page Brochure. (Undated)

Moscow Bauman Tech. Coll. Week 84/10, Issued 27 Jun. 84, a one page description.

Mechanisms, Linkages, and Mechanical Controls, by Chironis, a 4 page brochure, 12-1965.

*Primary Examiner*—Dwight G. Diehl
*Assistant Examiner*—Scott Anchell
*Attorney, Agent, or Firm*—Seed and Berry

[57] ABSTRACT

A fluid-powered rotary actuated support for a platform, having a body with a vertical axial orientation during use. A drive member has a drive shaft extending coaxially within the body and a flange attached to an end portion of the shaft toward an upper body end. The shaft and flange are formed as an integral unit free of connection joints therebetween. The flange projects radially outward from the shaft beyond an inner body surface and is rotatable relative to the body through a horizontal plane. A first ball race is formed in the flange and a second ball race is formed in the body with balls disposed therebetween. Linear-to-rotary transmission means disposed within the body are operable for providing rotational movement between the drive member and body. The body utilizes a stationary seal to facilitate seal placement and reduce the overall length of the body. In one embodiment, the transmission means includes a plurality of rollers each having at least two roller disks adjustably axially movable relative to each other within a limited range for backlash elimination purposes. The rollers are rotatably disposed on spindles, each having a free end portion attached to an annular support plate and an opposite end portion rotatably disposed in a piston sleeve bore hole for rotational adjustment of the spindles to axially move the support plate and apply an axial force on the roller disks.

34 Claims, 3 Drawing Sheets

U.S. PATENT DOCUMENTS

| | | | |
|---|---|---|---|
| 2,571,789 | 6/1956 | Orenick | 74/424.8 C X |
| 2,791,128 | 5/1957 | Geyer et al. | 74/441 |
| 2,945,387 | 7/1960 | Geyer | 74/89.15 |
| 2,959,064 | 11/1960 | Geyer et al. | 74/441 |
| 3,020,775 | 2/1962 | Musser | 74/440 |
| 3,128,634 | 4/1964 | Eastman | 74/424.8 R |
| 3,165,007 | 1/1965 | Newbarth | 74/424.8 B |
| 3,187,592 | 6/1965 | Geyer | 74/89 |
| 3,191,780 | 6/1965 | Updigrave | 74/89.15 |
| 3,255,806 | 6/1966 | Meyer et al. | 160/188 |
| 3,295,385 | 1/1967 | Jenny | 74/424.8 B |
| 3,333,483 | 9/1967 | Maci et al. | 74/424.8 R |
| 3,339,463 | 9/1967 | Updigrave | 74/89.15 |
| 3,406,584 | 10/1968 | Roantree | 74/424.8 R |
| 3,508,452 | 4/1970 | Roantree | 74/424.7 |
| 3,554,457 | 1/1971 | Hutzenlaub | 384/504 X |
| 3,577,796 | 5/1971 | Eissfeldt | 74/459 |
| 3,585,869 | 6/1971 | Lemor | 74/89.15 |
| 3,595,094 | 7/1971 | Lemor | 74/89.14 |
| 3,638,507 | 2/1972 | Orner | 74/424.8 R |
| 3,670,583 | 6/1972 | Leming | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |
| 4,276,003 | 6/1981 | Perkins et al. | 417/415 |
| 4,313,367 | 2/1982 | Weyer | 92/33 |
| 4,369,011 | 1/1983 | Ploss | 411/223 |
| 4,409,888 | 10/1983 | Weyer | 92/31 |
| 4,425,009 | 10/1984 | Fillon et al. | 384/504 X |
| 4,493,614 | 1/1985 | Chu et al. | 417/22 |
| 4,508,016 | 4/1985 | Weyer | 92/33 |
| 4,576,057 | 3/1986 | Saari | 74/424.8 C |
| 4,590,816 | 5/1986 | Weyer | 92/33 X |
| 4,603,616 | 8/1986 | Zajac | 92/33 |
| 4,667,528 | 5/1987 | Weyer | 74/424.8 N A |
| 4,683,767 | 8/1987 | Weyer | 74/409 |
| 4,691,582 | 9/1987 | Weyer | 74/409 |
| 4,741,250 | 5/1988 | Weyer | 92/33 |

FLUID-POWER BEARING ACTUATOR

CROSS-REFERENCES TO RELATED APPLICATIONS

This is a continuation-in-part application of copending applications Ser. No. 006,007, filed Jan. 20, 1987, Ser. No. 931,223, filed Nov. 14, 1986, and Ser. No. 881,904, filed Jul. 3, 1986; now issued as U.S. Pat. No. 4,741,250, which are continuation-in-part applications of applications Ser. No. 662,256, filed Oct. 17, 1984 now issued as U.S. Pat. No. 4,667,528, Ser. No. 692,293, filed Jan. 17, 1985 now issued as U.S. Pat. No. 4,683,767, and Ser. No. 803,954, filed Dec. 2, 1985 now issued as U.S. Pat. No. 4,691,582; which are continuation-in-part applications of application Ser. No. 575,228, filed Jan. 30, 1984 now issued as U.S. Pat. No. 4,590,816.

TECHNICAL FIELD

The present invention relates generally to actuators and other fluid power devices, and more particularly, to fluid-power devices of the type in which axial movement of a piston results in or is produced by relative rotational or linear movement between a body and an output member.

BACKGROUND OF THE INVENTION

Rotary helical splined actuators have been employed in the past to achieve the advantage of high-torque output from a simple linear piston-and-cylinder drive arrangement. The actuator typically uses a cylindrical body with an elongated rotary output shaft extending coaxially within the body, with an end portion of the shaft providing the drive output. An elongated annular piston sleeve is disposed between the body and the shaft and coaxially receives the shaft therein. The piston sleeve has a sleeve portion splined to cooperate with corresponding splines on the body interior and the output shaft exterior. The piston sleeve is reciprocally mounted within the body and has a head for the application of fluid pressure to one or the other opposing sides thereof to produce axial movement of the piston sleeve.

As the piston sleeve linearly reciprocates in an axial direction within the body, the outer splines of the sleeve portion engage the splines of the body to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body.

While such an arrangement produces a relatively high-torque output, the capability of the actuator to support high moment loads and large axial thrust loads has been limited. The actuator typically has a slender shaft with bearings between the shaft and end flanges or end caps of the body, with the bearings positioned radially inward of the body sidewall. It is desirable to use rotary actuators to rotate platforms carrying heavy loads, such as a large diameter platform which extends radially far beyond the actuator body and which carries a crane, bucket lift or other mechanism having a boom reaching far outward of the platform. One such arrangement is shown in the inventor's U.S. Pat. No. 4,508,016.

The actuator body is vertically oriented and attached to the frame of the vehicle or other structure carrying the platform, and the actuator shaft is attached to the platform to cause its rotation. In the aforementioned patent, the platform weight is supported by the actuator body rather than the shaft, but in many situations it is desirable to have the actuator shaft directly support the platform. The conventional actuator is not well constructed to handle the high moments encountered when the shaft centrally supports a platform since it does so in an almost needle point balanced arrangement. In such an arrangement, when the boom of the device carried by the platform is extended, the moments become extremely large and difficult for the conventional actuator shaft and shaft bearing configuration to handle. Further, the axial thrust loads encountered due to the weight of the platform, the crane or other mechanism mounted thereon and the workload it carries are far too great for the conventional actuator shaft bearing configurations. Other substantially vertical orientations of the actuator are envisioned which also subject the actuator shaft to high moments and large axial thrust loads, such as used to steerably turn the wheel assembly of a vehicle while supporting the weight of the vehicle above the wheel assembly.

The long length of prior art rotary actuators resulting from the conventional actuator construction used has also been a limitation to use of such actuators to rotate platforms, as well as to their use in other situations requiring a shorter package to fit within the size constraints of the equipment design with which the actuator is to be used.

Another problem involves the backlash encountered in the torque-transmitting elements of the actuator as the piston sleeve moves from one axial direction to the other in response to the application of fluid pressure. While accurate machining will reduce the backlash problem, this procedure substantially increases the manufacturing cost. Even with accurate machining, conventional machining techniques are virtually incapable of totally eliminating the slack which produces the backlash problem. Furthermore, to the extent more accurate tolerances produce actuator parts which fit tightly together and reduce slack, assembly of the actuator becomes difficult. While accurate machining reduces slack initially, should the splined parts wear during usage or otherwise lose their original tolerances, no means exists for elimination of the slack that develops without disassembly of the actuator and possible remachining or replacement of the parts. Backlash is a particular problem when the actuator is used to rotate a crane or bucket lift platform since the backlash in the actuator tends to be magnified at the tip of the extended boom, reducing the control the operator has over the positioning of the boom tip and the stability of the boom as the piston sleeve moves from one axial direction to the other.

It will therefore be appreciated that there has long been a significant need for fluid-power bearing actuators and devices which are capable of handling increased moments and axial shaft loads. The device should have a reduced overall length and have means to eliminate backlash. The device should not require exceptionally accurate machining of the torque-transmitting parts to eliminate the slack that produces backlash. The actuator should be easy to assemble and provide means for eliminating the slack causing the backlash problem after the actuator is assembled. Elimination of the slack should be accomplished in a simple manner without requiring disassembly of the torque-transmitting parts from the body. The present invention fulfills these needs and further provides other related advantages.

DISCLOSURE OF THE INVENTION

The present invention resides in a fluid-power device having an elongated generally cylindrical body with first and second ends and a generally vertical axial orientation during use. The device includes a drive member with a generally cylindrical drive shaft portion extending generally coaxially within the body generally from the first body end toward the second body end and a flange portion attached to an end portion of the drive shaft portion toward the first body end. The drive shaft and flange portions are formed as an integral unit free of connection joints therebetween. The flange portion projects radially outward from the drive shaft portion to and beyond an inner surface of the body and is rotatable relative to the body through a generally horizontal plane during use.

Load carrying bearing means are disposed between the flange portion and the body at the first body end for allowing relative rotary motion between the drive member and the body. The bearing means includes a first ball race formed in the flange portion and a second ball race formed in the body toward the first body end with a plurality of balls disposed between the first and second ball races. The bearing means provides support against both axial thrust and radial loads applied to the flange portion. In a preferred embodiment of the invention, the first and second ball races have a center ball contact angle of from 30 to 60 degrees relative to the horizontal plain when in use. The device further includes linear-to-rotary transmission means disposed within the body and operable during powered operation for providing relative rotational movement between the drive member and the body.

In the preferred embodiment of the invention, the body has at least one groove formed on an inward end portion of the inner surface thereof toward one of the first or second body ends, and the second ball race is formed in a portion of the body radially outward of the deepest cut of the body groove formed ont he inner body surface. The drive shaft portion may also have at least one helical groove informed on an outer surface thereof, with the body groove and shaft groove each having a helix angle of 10 to 35 degrees and cooperating with the linear to rotary transmission means to provide relative rotational movement between the drive member and the body.

In connection with another aspect of the invention, the body has a pair of axially spaced apart fluid ports therein for introducing pressurized fluid within the body and a stationary seal position between the ports axially outward of the grooved body end portion, and the linear to rotary transmission means includes a reciprocating piston having a smooth surface portion slidably engaging the stationary seal as the piston axially reciprocates within the body to define a pair of fluid tight compartments to each side of the piston. Each of the compartments is in fluid communication with a different one of the ports. The one of the ports positioned axially outward of the stationary seal toward the other one of the first or second body ends away from the grooved body end portion is positioned axially inward of the end limit of travel of the piston.

In accordance with another aspect of the invention, one of the body or the drive member has at least two helical grooves formed on a surface portion thereof positioned within the body. The device further includes at least one roller comprised of at least two roller disks which are independently and adjustably axially movable relative to each other within at least a limited range. Each of the roller disks has at least one circumferential ridge. The device further includes an axially reciprocating member reciprocally mounted within the body. The reciprocating member rotatably retains the roller in fixed axially and circumferential position relative to the reciprocating member during powered operation of the device with the roller in seated roller engagement with the grooved surface portion for transmitting force between the reciprocating member and the one of the body or the drive member having the grooved surface portion. Each of the ridges of the roller disks is positioned for rolling travel in a corresponding one of the helical grooves of the grooved surface portion. At least one piston is mounted for reciprocal movement and operatively engages the reciprocating member.

The device further includes adjustment means for selectively and adjustably axially moving one or the other of the roller disks of the roller relative to the other within the limited range by an amount sufficient to eliminate backlash between the reciprocating member and the grooved surface portion as the piston moves from one axial direction to the other as the piston reciprocates. This occurs while maintaining at least one or the other of the roller disks in rolling engagement with the grooved surface as the piston moves in one axial direction and at least the other of the roller disks in rolling engagement with the grooved surface as the piston moves in the other axial direction.

In a preferred embodiment of the invention, the reciprocating member includes a spindle extending to a position adjacent to the grooved surface portion. The spindle has the roller coaxially and rotatably retained thereon and retained against axial movement relative to the spindle during powered operation of the device. The spindle is retained by the reciprocating member to prevent axial movement of the spindle relative to the reciprocating member during powered operation. The two roller disks which comprise the roller are axially spaced apart on the spindle by an adjustment space at least as large as the limited space. At least one of the two roller disks is axially movable through the adjustment space for axial movement of the movable roller disk relative to the other of the roller disks through the adjustment space to eliminate backlash by operation of the adjustment means.

In a preferred embodiment, the adjustment means includes an adjustment member disposed on the spindle spaced away from the reciprocating member with the roller positioned therebetween. The adjustment member is axially movable on the spindle in response to rotation of the spindle to apply axial force on the roller disks to move one or the other of the roller disks relative to the other within the limited range by an amount sufficient to eliminate backlash. The spindle is selectively and adjustably rotatable to axially move the adjustment member.

In the preferred embodiment, the device includes a plurality of rollers each having at least two roller disks and the adjustment member is an annular spindle support plate. The support plate has a plurality of circumferentially distributed spindle openings each to receive a free end portion of one spindle and provide support thereto against lateral forces on the cantilevered spindles. A second end portion of the spindle is rotatably disposed in a bore hole in the reciprocating member for selective adjustable rotation thereof to eliminate backlash. The spindle is restrained against axial movement in the direction of the rollers by a spindle head portion.

Other features and advantages of the invention will become apparent from the following detailed description, taken in conjunction with accompanying drawings.

BEST MODE FOR CARRYING OUT THE INVENTION

Figure 1:
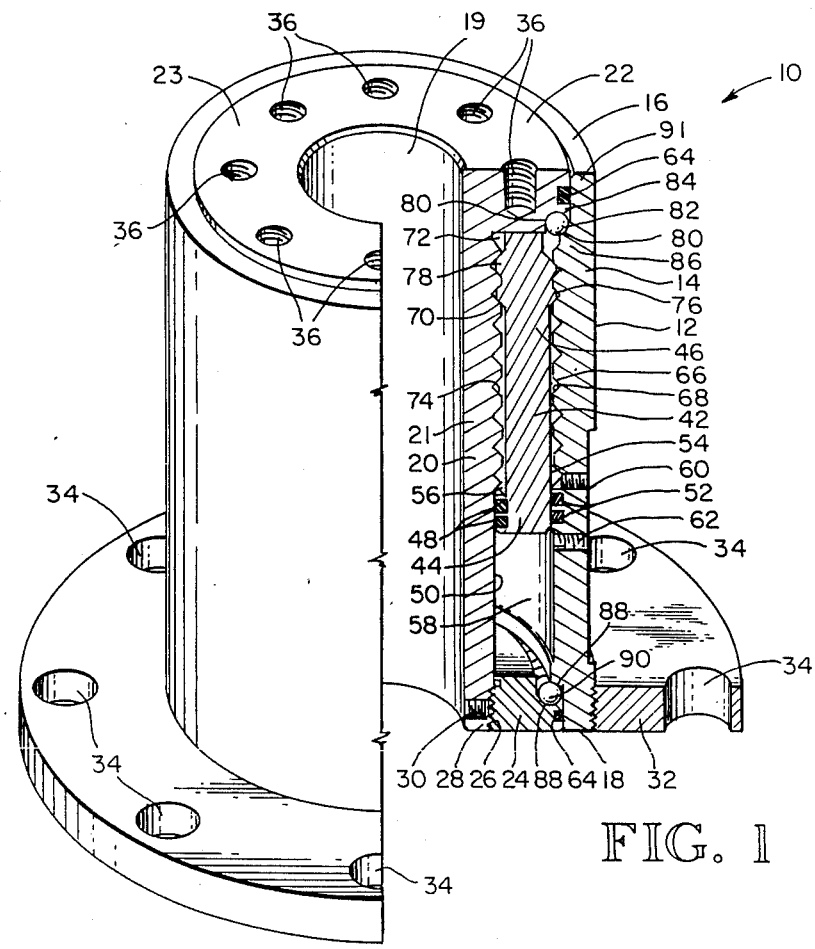
FIG. 1 is a sectional, isometric view of a fluid-powered rotary splined actuator embodying the present invention.

As shown in the drawings for purposes of illustration, the present invention is embodied in a fluid-power device 10. A first embodiment of the device is a rotary actuator 10 shown in FIG. 1. The actuator 10 includes an elongated housing or body 12 having a cylindrical sidewall 14 and first and second ends 16 and 18, respectively. A rotary output shaft 20 having an open ended hollow center bore 19 is coaxially positioned within the body 12 and supported for rotation relative to the body. The shaft 20 is substantially coextensive with body 12 to provide a compact design without shaft ends projecting significantly beyond the body ends.

Figure 2:
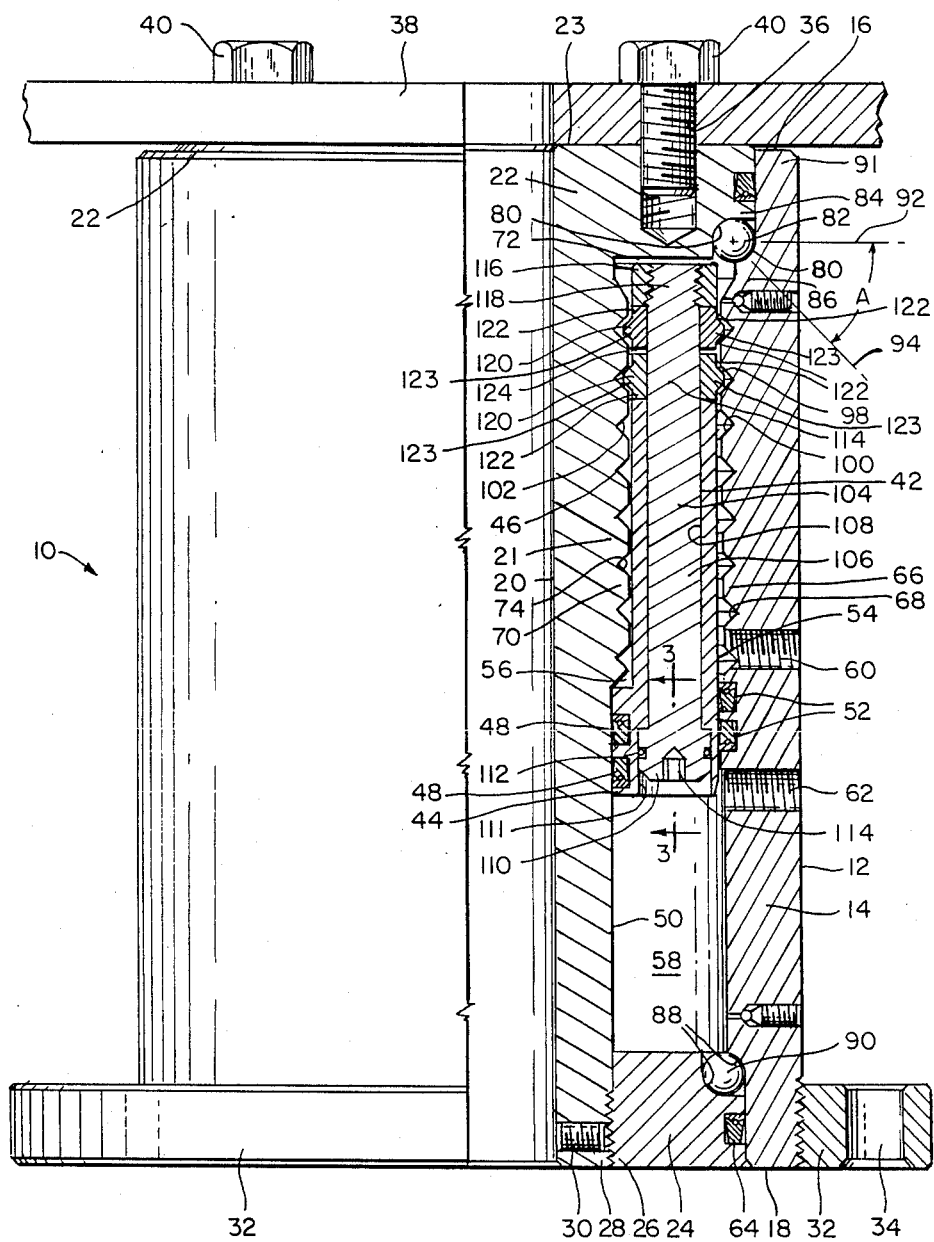
FIG. 2 is a side elevational, sectional view of an alternative of the actuator of FIG. 1 using torque-transmitting rollers with backlash elimination means showing a platform mounted to the shaft flange.

The shaft 20 includes a central elongated portion 21 axially projecting substantially the full length of the body 12 and a radially outward projecting annular flange portion 22. The central elongated shaft portion 21 and the flange portion 22 are formed as an integral unit such as from a single piece of machined stock. The flange portion 22 is positioned at the first body end 16 and protrudes only slightly beyond the first body end 16 to provide a flat outwardly facing mounting surface 23 to which can be attached an external device (not shown) to be rotated relative to the body 12. The shaft flange portion 22 has a plurality of outwardly opening threaded holes 36 circumferentially spaced thereabout away from the central rotational axis of the shaft 20 for coupling to the external device, such as a platform 38 as shown in FIG. 2, by a plurality of fastening bolts 40. It is to be understood that the invention may be practiced with the shaft 20 rotatably driving an external device, or with the shaft being held stationary and the rotational drive being provided by rotation of the body 12.

The central elongated shaft portion 21 has an annular nut 24 threadably attached thereto at the second body end 18. The shaft nut 24 has a threaded interior portion 26 threadably attached to a correspondingly threaded perimeter portion 28 of the central elongated shaft portion 21. The shaft nut 24 is locked in place against rotation by a set screw 30.

Figure 5:
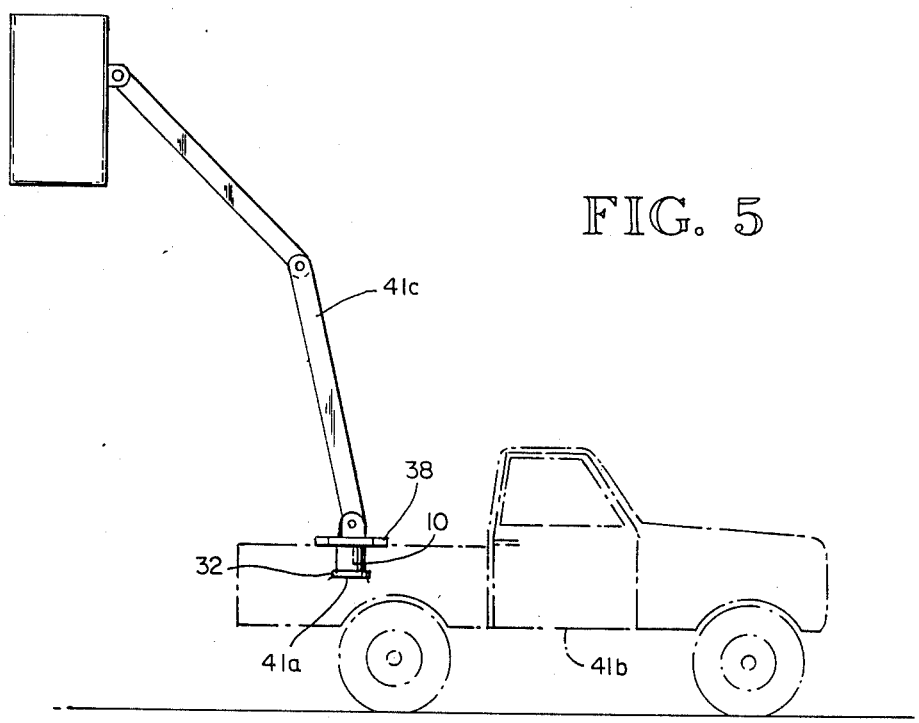
FIG. 5 is a reduced scale side elevational view of a truck mounted bucket lift using the actuator of the present invention to rotate the platform to which the boom is attached.
Figure 6:
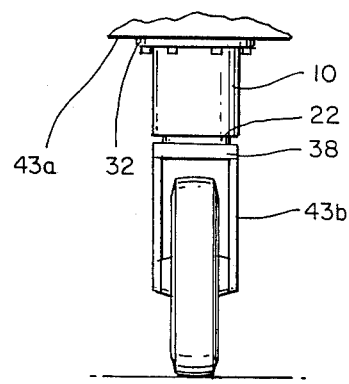
FIG. 6 is a reduced scale side elevational view of a steering assembly of a vehicle using the actuator of the present invention, shown with inverted orientation compared to FIGS. 1, 2 and 5, to rotate a wheel assembly.

At the second end 18, the body 12 has a radially outward projecting attachment flange portion 32 having a plurality of smooth bore holes 34 circumferentially spaced thereabout for attachment of the body to a support frame (not shown) such as a support frame 41a of a bucket lift truck 41b as shown in FIG. 5 or a vehicle body frame 43a to rotate a vehicle wheel assembly 43b as shown in FIG. 6.

An annular piston sleeve 42 is coaxially and reciprocally mounted within the body 12 coaxially about the shaft 20. The piston sleeve 42 has an elongated annular head portion 44 positioned toward the second body end 18, and a cylindrical sleeve portion 46 fixedly attached to the head portion and extending axially therefrom toward the first body end 16.

The head portion 44 carries a pair of conventional inner seals 48, disposed to provide a seal between the head portion and a corresponding, longitudinally extending smooth wall portion 50 of the shaft 20. The body sidewall 14 has a pair of stationary seals 52 positioned along a midportion of the sidewall, disposed to provide a seal between the body sidewall and a corresponding, longitudinally extending smooth wall portion 54 of the head portion 44. The head portion 44 and stationary seals 52, and the inner seals 48 define fluid-tight compartments 56 and 58 to each side of the head portion toward the first body end 16 and the second body end 18, respectively. The smooth wall portion 50 of the shaft 20 and the smooth wall portion 54 of the sleeve portion 46 have sufficient axial length to accommodate the full end-to-end reciprocating stroke travel of the piston sleeve 42 within the body 12.

Reciprocation of the piston sleeve 42 within the body 12 occurs when hydraulic oil or air under pressure selectively enters through one or the other of a port 60 and a port 62 located in the body sidewall 14, each adjacent to an axially opposite side of the stationary seals 52 of the body sidewall. As used herein "fluid" will refer to hydraulic oil, air or any other fluid suitable for use in the actuator 10. The ports 60 and 62 each communicates with one of the fluid-tight compartments 56 and 58, respectively. Conventional seals 64 are disposed between the shaft flange portion 22 and the body 12 toward the first body end 16 and between the shaft nut 24 and the body 12 toward the second body end 18 to prevent fluid leakage from the compartments 56 and 58 as the shaft 20 rotates.

The application of fluid pressure to the compartment 56 produces axial movement of the piston sleeve 42 toward the second body end 18. The application of fluid pressure to the compartment 58 produces axial movement of the piston sleeve 42 toward the first body end 16. The actuator 10 provides relative rotational movement between the body 12 and the shaft 20 through the conversion of linear movement of the piston sleeve 42 into rotational movement of the shaft, in a manner well known in the art.

An inward facing surface portion 66 of the body sidewall 14 extending generally between the stationary seals 52 and the first body end 16 has cut therein inner helical threads or splines 68. An outward facing surface portion 70 of the shaft 20 extending generally between the shaft smooth wall portion 50 toward the shaft flange portion 22 has cut therein outer helical threads or splines 74. The grooved shaft portion 70 is located generally opposite the grooved body portion 66 and spaced apart radially inward therefrom to define a circumferential space 72 therebetween. The sleeve portion 46 of the piston sleeve 42 has cut in an outward facing surface portion thereof outer helical threads or splines 76 which mesh with the inner helical splines 68 of the body 12, and has cut in an inward facing surface portion thereof inner helical threads or splines 78 which mesh with the outer helical splines 74 of the shaft 20. The coaction of the pair of meshing splines 68 and 76 and the pair of meshing splines 74 and 78 comprise the linear-to-rotary conversion means which produces rotation of the shaft 20 as the piston sleeve 42 reciprocates. It is noted that the pitches and leads for the two pairs of meshing splines may differ to produce the desired output characteristics of the actuator. Alternative linear-to-rotary conversion means may also be used, such as the roller and spindle arrangement shown in FIG. 2 which will be described in more detail below.

In accordance with one aspect of the present invention, the shaft flange portion 22 and the body sidewall 14 toward the first body end 16 each have a confronting and corresponding circular ball race 80 integrally formed therein with a plurality of balls 82 disposed between the ball races. The ball race 80 in the shaft flange portion 22 is formed in a downwardly facing lower edge portion 84 thereof, and the ball race 80 in the body sidewall 14 is formed in an upwardly facing shoulder portion 86 thereof concentric with the body sidewall. The center ball contact points of the two ball races 80 are diametrically opposed to each other with respect to the balls 82 therebetween. As best illustrated with the embodiment shown in FIG. 2 having an identical shaft flange arrangement, the ball contact angle "A" established by a straight line drawn between the center ball contact points with each of the ball races 80 and shown by the phantom line 92, is from 30 to 60 degrees from the horizontal, shown by the phantom line 94. With such a ball contact angle, the ball races 80 and balls 82 serve to rotatably support the shaft 20 against both radial and axial thrust loads with a single bearing.

In the present preferred embodiments of the invention, the actuator 10 is mounted with its longitudinal axis aligned substantially vertically so the ball races 80 and balls 82 evenly handle the entire vertical thrust load applied to the shaft 20. When the actuator 10 of FIGS. 1 and 2 is oriented with the shaft flange portion 22 upward, as shown in the truck mounted bucket lift of FIG. 5, the large axial thrust loading is downward. When the actuator 10 is oriented with the shaft flange portion 22 downward, as shown in the wheel steering assembly of FIG. 6, the large axial thrust loading is upward.

By use of the shaft flange portion 22 which extends radially outward far beyond the central elongated shaft portion 21, with the ball race 80 of the flange portion at an outer edge portion 84 thereof, the shaft 20 has greater support against vertical moments applied to the shaft, such as when used to rotate large platforms, mounted thereto, such as platform 38 shown in FIG. 2, than do conventional actuators, particularly if a load carrying boom 41c (see FIG. 5) is extended outward beyond the platform. With the use of the shaft flange portion 22, the points of attachment of the platform 38 to the shaft 20 provided by the threaded attachment holes 36 in the shaft flange portion may be spaced radially outward from the central rotational axis of the shaft portion 20. This allows the attachment holes 36 to be positioned radially farther from the shaft rotational axis a larger diameter than possible with prior art platform actuators using small diameter shafts to provide more stable and stronger attachment.

In addition, since the shaft flange portion 22 and the central elongated shaft portion 21 are formed as an integral unit, the axial thrust loads applied to the shaft are transmitted directly to the body 12 through the ball races 80 and the balls 82 without passing through any joints, such as would be the situation if a threaded joint was used. By way of illustration, this type of threaded joint is used to attach the shaft nut 24 to the central elongated shaft portion 21 at the second body end 18. By the use of an integral construction for the central elongated shaft portion 21 and the shaft flange portion 22, maximized load handling ability is achieved with a minimized chance of failure since no joints are needed as when constructed using two separate parts.

The ability to handle high moments and large axial thrust loads has heretofore been the limiting factor in use of rotary actuators to rotate large diameter platforms, particularly when the platform supported a boom which might reach out far beyond the platform to increase the moment applied to the shaft. While attempts have been made in the past to use a rotary actuator to rotate a crane platform, such as by the inventor himself in U.S. Pat. No. 4,508,016, the drive shaft could not be used to directly support the load without the resulting bending loads in the shaft caused by platform loading, producing binding between the actuator shaft, piston sleeve and body. In an attempt to overcome this problem, the platform in the aforementioned patent was supported by a body flange, with bearings disposed therebetween, while the shaft was flexibly coupled to the platform to minimize bending loads being transmitted to the shaft. Although this approach is satisfactory in certain situations, in other situations it is desirable to have the shaft directly support the platform, with the shaft in turn supported by the actuator body, such as with the rotary actuator of the present invention shown in FIGS. 1 and 2.

To further provide a strong construction for the actuator 10 against axial thrust loads, the circular ball race 80 of the body sidewall 14 has a diameter measured from the shaft rotational axis larger than the diameter of the deepest cut of the inner helical splines 68 in the body sidewall. Thus, axial thrust loading on the shaft 20 is transmitted downward through the ball races 80 and balls 82 to the body sidewall ball race 80 through a solid wall portion of the body sidewall located radially outward of the body splines 68. As such, the body sidewall and its axial thrust load carrying ability is not weakened by the cutting of the body splines 68 therein. Loads are, thereby, not applied to that inwardly located portion of the body sidewall undercut by the body splines 68 and having less shear strength. To allow for sufficient radial extension of the shaft flange portion 22, the body sidewall 14 at the first body end 16 has a recessed interior sidewall portion 91 with a larger diameter than the adjacent inward facing surface portion 66 of the body sidewall in which the body splines 68 are cut.

By so positioning the body sidewall ball race 80 radially outward of the deepest cut of the inner helical body splines 68, the insertion of the piston sleeve 42 into the body 12 during assembly is also facilitated since the ball race is positioned radially outward of the body splines 68 and is out of the way of the piston sleeve outer splines 76 when the piston sleeve 46 is inserted into the body. As described above, the piston sleeve splines 76 must mesh with the body splines 68.

The shaft nut 24 and the body sidewall 14 toward the second body end 18 also each have a confronting and corresponding circular ball race 88 integrally formed therein with a plurality of balls 90 disposed between the ball races. While the same general construction is used as with the ball races 80 in the shaft flange portion 22 and the body sidewall shoulder portion 86, the lower pair of ball races 88 do not provide support against downward axial thrust when oriented as shown in FIGS. 1 and 2, which is the primary axial thrust load realized when supporting a platform. The shaft nut 24 and races 88 do assist in handling moments applied to the shaft 20 by preventing radial movement of the end of the shaft toward the second body end 18.

By use of a shaft 20 with a relatively large diameter central elongated portion 21, rather than a thin, solid core drive shaft as is conventional in most actuators, not only is the load carrying ability of the actuator 10 inherently increased, it is also possible to provide the hollow center bore 19 in the shaft. The hollow center bore 19 can be conveniently used to pass hydraulic lines and electrical wires therethrough between the crane or other device carried by the platform and the support frame below the actuator, generally along the common axis of rotation of the actuator, platform and crane. This overcomes the problems encountered in the past with handling control lines and wires when using rotary actuators having solid core shafts to rotate platforms.

As previously described, the seals 52 disposed to provide a seal between the body sidewall 14 and the head portion 44 of the piston sleeve 42 is stationary. As a result, the fluid ports 60 and 62 may be located immediately to each side of the seals 52, which facilitates placement of the ports in a position which does not interfere with the reciprocating head portion 44 of the piston sleeve 42. While placement of the ports is always a problem, of even more significance is that the use of the stationary seals 52 between the ports 60 and 62 allows reduction of the overall length of the actuator body 12. Reduction in body length is achieved because of the flexibility achieved locating the port 62, which in the past generally had to be located in the body sidewall 14 axially outward of the end limit of travel of the head portion 44 toward the second body end 18. If not so located, since the seal was carried by the head portion in the past, the head portion would pass over the port during the course of a stroke, with fluid being undesirably applied to both sides of the head portion (and to both fluid chambers) during a single stroke. Of course, it was also necessary to locate the port axially beyond the end limit of travel of the head portion carrying the seal so that would not contact and be cut by the port. To do so, the body sidewall generally was lengthened to accommodate positioning of the port, or alternatively, the port was located in a body end wall. Placement of the port in a body end wall is not possible with an actuator of the general design shown in the drawings since it has no body end wall. Rather, the body end opening at the second body end 18 is closed off by the shaft nut 24 which rotates with the shaft 20.

While rotary actuators have an inherently high torque output, when used in a vertical orientation to selectively rotate a platform mounted coaxial with the actuator shaft, even a platform carrying a bucket lift or a large crane does not require much torque to be rotated if adequate support bearings are used. Rather, the critical parameter becomes the axial thrust and moment carrying ability of the actuator (i.e., its bearing capability). As such, it is possible to utilize in the actuator 10 of the present invention less efficient helix angles than with prior art actuators. In the actuator 10 helix angles in the range of 10 to 30 degrees are used for the splines of the linear-to-rotary conversion means as compared with prior art actuators which typically used helix angles of 45 to 60 degrees (measured with respect to a line transverse to the longitudinal rotational axis of the shaft and body, as thread angle is conventionally measured for screws). By using a thread or helix angle of 10 to 30 degrees and an enlarged diameter for the shaft central elongated portion 21, the axial length of the shaft 20 and body 12 necessary to accommodate sufficient spline lengths to produce the desired piston sleeve displacement and rotational output, is significantly shortened. Since a shorter body is possible as a result of this and as a result of the use of the stationary seal 52 as described above, the overall actuator length is greatly decreased, making the actuator package of a size more compatible as a platform rotating device.

The use of helix angles of 10 to 30 degrees also reduces the cost of manufacturing the actuator 10 since screw cutting methods can be used to fabricate the splines using wheel cutters (a milling process). This is to be compared to the more expensive gear shaping process using expensive gear cutting equipment needed when cutting spline helix angles of 45 to 60 degrees in a relatively long actuator body.

While helix angles of 10 to 35 degrees are less efficient, they do provide another advantage for the actuator 10 of the present invention since low efficiency linear-to-rotary conversion inherently creates a self locking device with respect to relative movement between the body 12 and shaft 20 when the actuator 10 is not being fluid powered. Rotational movement of the platform ceases very quickly once driving fluid power to the ports 60 and 62 is terminated by the operator or full piston sleeve travel is realized. Similarly, the actuator 10 is not responsive to external forces applied to the platform 38 which tend to cause rotational movement between the shaft and body. This position retaining feature is achieved without the need for additional braking mechanisms.

This is because while the momentum of the rotating platform 38 will tend to further rotate the shaft 20, and hence the platform, even after the operator terminates driving fluid flow to the ports, the low efficiency splines of the actuator will hold the shaft against further movement. Similarly, when the piston sleeve 42 reaches its end limit of travel toward the first or second body end, the shaft will be held against further movement relative to the body 12 resulting from platform momentum. The result is better than a separate brake mechanism. When an external rotating force is applied to the platform 38, the actuator shaft is similarly held in position to prevent rotation. This is better than adding a separate braking mechanism.

The position retaining feature is particularly important if the actuator is used as a vehicle steering device to rotate a wheel assembly such as shown in FIG. 6. In this use, the actuator 10 is inverted relative to when used with a crane platform, and the shaft flange portion 22 faces downward for attachment to the "platform" of the wheel assembly 43b to be selectively rotated. As such, the large axial thrust load realized is upward in direction. If the wheel assembly should engage a curb at an angle of incidence tending to rotate the shaft of the steering actuator, the position retaining feature of the actuator prevents rotation from occurring and keeps the wheel assembly properly aligned. In all situations this feature also tends to insulate the support frame to which the actuator body is attached from the shock load which would otherwise pass back through the linear-to-rotary conversion means to the support frame.

In an alternative embodiment of the invention shown in FIG. 2, the identical construction is used as with the embodiment of FIG. 1 except instead of splines, the sleeve portion 46 of the piston sleeve 42 supports a plurality of free rotatable rollers 98 disposed in the circumferential space 72 between the shaft 20 and the body sidewall 14. In this embodiment the inward facing surface portion 66 of the body sidewall 14 toward the first body end 16 has cut therein a plurality of helical grooves 100, and the outward facing surface portion 70 of the shaft 20 has cut therein a plurality of helical grooves 102. The helical body and shaft grooves 100 and 102 extend about the body sidewall 14 and the shaft 20, respectively.

The helical body grooves 100 have an opposite hand or direction of turn from the helical shaft grooves 102, but have substantially the same axial pitch as the helical shaft grooves. The number of grooves or groove starts comprising the plurality of helical body and shaft grooves 100 and 102 may vary from design to design, but preferably the numbers used are interrelated.

The rollers 98 are disposed in a circumferentially aligned row in the circumferential space 72 between the grooved body portion 66 and the grooved shaft portion 70 and transmit force therebetween. The rollers 98 each have an outward facing surface with a plurality of circumferential grooves with circumferential ridges therebetween. The circumferential grooves and ridges of each roller 98 extend about the roller in parallel spaced apart radial planes. The circumferential ridges of the rollers 98 have substantially the same axial pitch as the helical body and shaft grooves 100 and 102. The grooved body portion 66 has a first pitch diameter PD1 and the grooved shaft portion 70 has a second pitch diameter PD2. The rollers 98 have a pitch diameter PD3 sized based upon the first pitch diameter PD1 of the grooved body portion 66 and the second pitch diameter PD2 of the grooved shaft portion 70, substantially according to the relationship:

$$PD3 = PD1 - PD2/2$$

As used herein "pitch diameter" is the diameter of the grooved part measured from the groove half-depth position.

The rollers 98 are rotatably retained in fixed axial and circumferential position relative to the piston sleeve 42 as the piston sleeve reciprocates within the body 12 during fluid-powered operation of the actuator 10 by a plurality of cylindrical shaft spindles 104. Each of the spindles 104 has a coaxially extending and integrally formed support arm portion 106 disposed in one of a plurality of bore holes 108 formed in the piston sleeve 42. The bore holes 108 are evenly circumferentially spaced-apart about the piston sleeve 42 and axially extending fully through the sleeve portion 46 and the head portion 44 of the piston sleeve.

Figure 3:
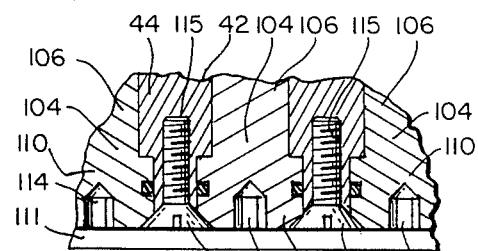
FIG. 3 is an enlarged sectional view taken substantially along the line 3—3 in FIG. 2.

The support arm portion 106 has a head 110 received in a circular groove 111 formed in the head portion 44 to recess the support arm head from being exposed to impact when the head portion 44 of the piston sleeve 42 reaches its full end limit of travel toward the second body end 18. An O-ring seal 112 is provided in the support arm head 110 to prevent fluid leakage between the compartments 56 and 58. A hexagonal recess 114 is provided in the support arm head 110, in the axial end face thereof, to receive a correspondingly shaped tool for rotation of the spindles 104 to eliminate backlash, as will be described in more detail below. As best shown in FIG. 3, a flat headcap screw 113 is threadably received in a threaded bore 115 located between each adjacent pair of bore holes 108 to position the head of the screw 113 in engagement with a bevelled edge portion of the support arm head 110 of each pair of adjacent spindles 104 to lock the spindles against turning during fluid-powered operation once adjusted to eliminate backlash.

At the first body end 16, the spindles 104 project into the circumferential space 72 between the body sidewall 14 and the shaft 20 and hold the rollers 98 restrained against axial movement relative to the spindles for rotation about the spindles on axes in parallel axial alignment with the body 12. In alternative constructions, the spindles may be designed to hold the rollers at a skewed angle.

The spindles 104 retain the rollers 98 in circumferentially distributed, spaced apart positions within the circumferential space 72 about the shaft 20 with each of the rollers in seated engagement and coacting with the helical body grooves 100 and the helical shaft grooves 102 for transmitting force between the body 12, the shaft 20 and the piston sleeve 42. Each ridge of the rollers 98 is positioned for rolling travel in corresponding grooves of both the helical body grooves 100 and the helical shaft grooves 102, and the corresponding ridges of adjacent rollers are axially positioned in generally the same plane or may be axially offset from one another, as desired.

Each of the spindles 104 has one of the rollers 98 coaxially and rotatably retained thereon and restrained against axial movement relative to the spindle. The rollers 98 each have a longitudinally extending coaxial roller bore with a self lubricating coating for rotatably receiving a smooth surface end portion 114 of one of the spindles 104 projecting outward beyond the end of the sleeve portion 46 of the piston sleeve 42. The spindle end portion 114 also has a self lubricating coating. The roller is held in place on the spindle 104 by an annular spindle support plate 116. The support plate 116 has a plurality of circumferentially spaced-apart threaded holes 117 arranged to each threadably receive a threaded free end portion 118 of one of the spindle therein. The support plate 116 reduces problems and possible failure under large loads which may be encountered by the cantilever supported spindles, and as will be described below, assists in the adjustment to eliminate backlash.

In the illustrated embodiment of the invention in FIG. 2, each of the rollers 98 comprises two annular roller disks 120 independently and rotatably disposed on the spindle end portion 114 in juxtaposition. The two roller disks 120 operate together to form the roller 98. The roller disks 120 includes a pair of axially extending annular extensions 122, one to each side of a projecting ridge portion 123 of the roller that comprises one of the two roller ridges. The adjacent and corresponding extensions 122 of the two roller disks 120 which form a roller 98 hold the ridge portions 123 of the two roller disks spaced axially apart to provide the desired pitch for the roller. By increasing the axial length of the extensions 122 used, the roller pitch can be increased or decreased as needed without impacting the size and shape of the roller ridge portion 123, which may be designed for optimum groove contact.

Linear reciprocation of the piston sleeve 42 produces rotation of the piston sleeve 42 and the shaft 20 through the force-transmitting capability of the rollers 98, in the same manner as described above for the splines of FIG. 1. Through the application of fluid pressure to the fluid-tight compartments 56 and 58, torque is transmitted by the rollers 98 to the piston sleeve 42 through their coaction with the helical body grooves 100. The axial force created by fluid pressure on the head portion 44 causes the rollers 98 to roll along the helical body grooves 100 and transmit torque to the piston sleeve 42. The transmitted torque causes the piston sleeve 42 to rotate as it moves axially. The resulting linear and rotational movement of the piston sleeve 42 transmits both axial and rotational force to the shaft 20 through the coaction of the rollers 98 with the helical shaft grooves 102. The transmitted force causes the shaft 20 to rotate relative to the body 12 since axial movement of the shaft is restricted by the bearings comprising the ball races 80 and 88 and the balls 82 and 90 positioned therein. As such, axial movement of the piston sleeve 42 produced by fluid pressure is converted into relative rotational movement between the body 12 and the shaft 20. The resulting movement of the rollers 98, body 12 and shaft 20 when viewed from the body ends is much like the movement of a planetary gear arrangement.

Still referring to the embodiment of FIG. 2, the actuator 10 is provided with means for eliminating backlash in the force-transmitting parts and for axially preloading of the piston sleeve 42 and the rollers 98. Backlash results for the slack or free movement between the force-transmitting parts of the actuator. The slack is usually due to the sizing of the grooves of the body 12 and shaft 20, and the rollers 98 positioned therein, which transmit force between the body and the shaft through the reciprocation of the piston sleeve 42. Backlash occurs as the piston sleeve 42 moves from one axial direction to the other within the body as it reciprocates.

Figure 4:
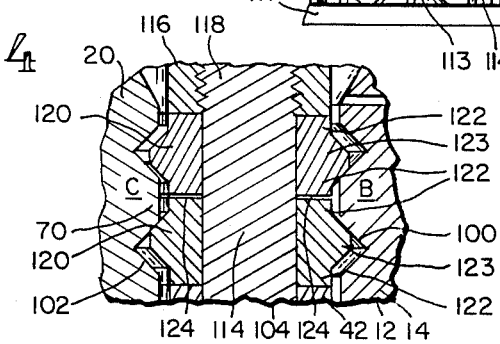
FIG. 4 is an enlarged fragmentary, side elevational, sectional view of one roller of FIG. 2 shown adjusted to eliminate slack which causes backlash.

As previously described, each of the spindles 104 has a roller 98 rotatably mounted thereon, and each roller is comprised of two roller disks 120. To provide for backlash elimination and preloading, the roller disks 120 are sized to produce an adjustment space 124 between the extensions 122 of the two roller disks comprising a roller 98 when installed on the spindle end portion 114 and positioned within the body 12 with the shaft 20 and piston sleeve 42 in place. As will be described, this adjustment space 124 allows for sufficient axial movement of the roller disks 120 toward each other to firmly engage between the ridge portions 123 of the two roller disks 120 one of the ridge portions of the helical body grooves 100 and one of the ridge portions of the helical shaft grooves 102, indicated in FIG. 4 by the letters "B" and "C", respectively.

The two roller disks 120 of the roller 98 are selectively and adjustably moved toward each other by adjustably turning the spindle 104 carrying the two roller disks using a hexagonal head tool inserted into the hexagonal recess 114 for the spindle support arm head 110 of the spindle with the shaft nut 24 removed prior to fluid-powered operation of the actuator 10. By so adjustably turning the support arm head 110, the support plate 116 is drawn toward the second body end 18 and the two roller disks 120 of the roller 98 being adjusted are caused to be moved together and clamp therebetween the ridge portions "B" and "C" (see FIG. 4) of the corresponding helical body and shaft grooves 100 and 102. Unlike with some forms of backlash elimination, this leaves one of the two roller disks 120 of each roller 98 in firm rolling engagement with the ridge portions "B" and "C" of the body and shaft grooves 100 and 102, whether the piston sleeve 42 is traveling axially toward the first body end 16 or the second body end 18. Thus each roller 98 in the set of rollers of the piston sleeve 42 carries part of the load regardless of the direction of axial travel of the piston sleeve. This is to be compared to other backlash elimination approaches that axially adjustably move every other one of the rollers relative to the other rollers to remove slack, where the entire roller is moved axially. By so doing, when under fluid-powered operation, the adjustment leaves only one-half of the total number of rollers in driving engagement with the ridge portions of the body and shaft grooves when the piston sleeve moves in one axial direction and only the other one-half of the rollers in driving engagement when the piston sleeve moves in the opposite axial direction. Since only one-half of the rollers are in driving engagement at any one time, the load carrying ability of the actuator is less than otherwise possible if all rollers were in driving engagement at all times.

Since the turning of one spindle 104 to adjust out slack and to preload the rollers 98 also causes the annular support plate 116 to have a similar effect, although to a lesser extent, on the other rollers, the backlash elimination adjustment should be accomplished by progressively turning of all spindles in sequence to partially and gradually adjust out backlash, rather than attempting to fully adjust backlash out of one spindle before adjusting the other spindles.

When substantially all slack between the rollers 98 and the helical body grooves 100 and between the rollers and the shaft grooves 102 has been eliminated, further axial adjustment of the roller disks 120 will apply an axial preloading force between the rollers and the helical body and shaft grooves. The lock screws 113 may then be tightened to lock the spindles 104 in place against further rotation, and the shaft nut 24 may be replaced on the shaft 20 to ready the actuator 10 for fluid powered operation. Should usage of the actuator 10 cause wear of the grooves or the rollers seated therein, or should slack occur for any other reason, the slack can be removed in the same manner described above by further axial adjustment of the spindles after the shaft nut 24 is removed. No other disassembly of the actuator 10 is required.

With the present invention, the grooves may be machined using conventional machining techniques with standard tolerances, and the slack which creates the backlash problem can be eliminated by adjustment prior to fluid-powered operation of the actuator 10. Furthermore, the grooves can be machined with a size to permit easy assembly of the actuator and the slack thereby introduced can be eliminated by adjustment. It is noted that the backlash elimination described will eliminate a generally equal amount of slack between the rollers 98 and the helical body grooves 100 and between the rollers and the helical shaft grooves 102.

It will be appreciated that, although specific embodiments of the invention has been described herein for purposes of illustration, various modifications may be made without departing from the spirit and scope of the invention. Accordingly, the invention is not limited except as by the appended claims.

I claim:

1. A fluid-powered, rotary actuated support for a crane or other device platform, comprising:

an elongated generally cylindrical body having first and second ends with a generally vertical axial orientation during use, said body having an outer surface and having at least one groove formed on an end portion of an inner surface thereof toward one of said first or second body ends, said body further having first and second axially spaced apart fluid ports therein for introducing pressurized fluid within said body and a stationary seal axially positioned between said ports axially away from said grooved body end portion toward an other one of said first or second body ends, said first port being to a side of said stationary seal axially toward said grooved body end portion and said second port being to a side of said stationary seal axially away from said grooved body end portion;

a drive member having a hollow generally cylindrical drive shaft portion extending generally coaxially within said body generally between said first and second body ends, and an annular flange portion attached to an end portion of said drive shaft portion towards said first body end at a position adjacent to and confronting the platform, said flange portion having attachment means for providing driving attachment to the platform with the platform positioned generally concentric with said cylindrical body at said first body end and rotatable relative thereto about a common generally vertical axis through a generally horizontal plane during use, said flange portion providing rotational drive between said body and the platform, said drive shaft and flange portions being formed as an integral unit free of connection joints therebetween, said flange portion projecting generally radially outward from said drive shaft portion to and beyond said inner surface of said body;

load-carrying bearing means disposed between said flange portion and said body at said first body end for allowing relative rotary motion between said drive member and said body for selective rotation of the platform, said bearing means including a first ball race formed in said flange portion and a second ball race formed in said body towards said first body end with a plurality of balls disposed between said first and second ball races, said first and second ball races having a center ball contact angle of from 30 to 60 degrees relative to said horizontal plane when in use, said second ball race being formed in a portion of said body radially outward of said body groove formed on said inner body surface and radially inward of said body outer surface, said bearing means providing support against both axial thrust and radial loads applied to said flange portion by the platform while carrying the crane or other device thereon and its load;

bearing means disposed between said drive member and said body for providing support against axial thrust applied to said drive member in the direction of said first end; and linear-to-rotary transmission means disposed within said body and operable in response to fluid pressure introduced within said body through said ports for providing relative rotational movement between said drive member and said body, said transmission means including a reciprocating piston with means for engaging said body groove and having a smooth surface portion slidably engaging said stationary seal as said piston axially reciprocates within said body to define a pair of fluid tight compartments to each side of said piston, each said compartment being in fluid communication with a different one of said ports, said piston having an end limit of travel toward said other one of said first or second body ends located between said second port and said other one of said first or second body ends.

2. A fluid-power rotary device, comprising:

an elongated, generally cylindrical body having first and second ends;

a drive member having a generally cylindrical drive shaft portion extending generally coaxially within said body generally from said first end towards said second body end, and a flange portion attached to an end portion of said drive shaft portion towards said first body end, said drive shaft and flange portions being formed as an integral unit free of connection joints therebetween, said flange portion projecting generally radially outward from said drive shaft portion to and beyond an inner surface of said body and being rotatable relative to said body through a plane generally transverse to said drive shaft portion;

load-carrying bearing means disposed between said flange portion and said body at said first body end for allowing relative rotary motion between said drive member and said body, said bearing means including a first ball race formed in said flange portion and a second ball race formed in said body toward said first body end, with a plurality of balls disposed between said first and second ball races, said bearing means providing support against both axial thrust and radial loads applied to said flange portion;

bearing means disposed between said drive member and said body for providing support against axial thrust applied to said drive member in the direction of said first end; and linear-to-rotary transmission means disposed within said body and operable during powered operation for providing relative rotational movement between said drive member and said body.

3. The fluid-power rotary device of claim 2 wherein said body has at least one groove formed on an end portion of said inner surface thereof toward one of said first or second body ends, said second ball race being formed in a portion of said body radially outward of said body groove formed on said inner body surface.

4. The fluid-power rotary device of claim 3 wherein said body further has first and second axially spaced apart fluid ports therein for introducing pressurized fluid within said body and a stationary seal positioned between said ports axially away from said grooved body end portion toward an other one of said first or second body ends, said first port being to a side of said stationary seal axially toward said grooved body end portion and said second port being to a side of said stationary seal axially away from said grooved body end portion, and said transmission means includes a reciprocating piston having a smooth surface portion slidably engaging said stationary seal as said piston axially reciprocates within said body to define a pair of fluid tight compartments to each side of said piston, each said compartments being in fluid communication with a different one of said ports, said piston having an end limit of travel toward said other one of said first or second body ends located between said second port and said other one of said first or second body ends.

5. The fluid-power rotary device of claim 2 wherein said first and second ball races having a center ball contact angle of from 30 to 60 degrees relative to said generally transverse plane when in use.

6. The fluid-power rotary device of claim 2 wherein said linear-to-rotary transmission means includes at least one helical groove formed on an end portion of said inner surface of said body and at least one helical groove formed on an outer surface of said drive shaft portion, said body groove and drive shaft groove each having a helix angle of 10 to 35 degrees.

7. A fluid-power device comprising:
a body having first and second ends and having at least one groove formed on an end portion of an inner surface thereof toward said first body end;
first and second axially spaced apart fluid ports for introducing pressurized fluid within said body, said second port being formed in a sidewall of said body toward said second body end;
a seal axially positioned at said body sidewall within said body and between said ports, axially away from said grooved body end portion toward said second body end, said seal being stationary with respect to said body;
an axially extending drive member supported for movement relative to said body and connectable to an external device, said drive member having at least one groove formed on a surface portion thereof, at least one of said body groove or said drive member groove being helical;
an axially reciprocating member reciprocally mounted within said body, said reciprocating member including means engaging said body groove for transmitting force between said body and said reciprocating member during powered operation and means engaging said drive member groove for transmitting force between said reciprocating member and said drive member during powered operation to provide relative movement between said drive member and said body; and
a piston mounted for reciprocal movement and operatively engaging said reciprocating member, said piston having a longitudinally elongated smooth surface portion slidably and sealably engaging said stationary seal as said piston axially reciprocates within said body alternately between end limits of travel toward said first and second body ends to define a pair of fluid tight compartments to each side of said piston, each said compartment being in fluid communication with a different one of said ports, said piston having an end limit of travel toward said second body end located between said second port and said second body end.

8. A fluid-power rotary device, comprising:
a body;
an axially extending drive member supported for movement relative to said body and connectable to an external device, one of said body or said drive member having at least two helical grooves formed on a surface portion thereof positioned within said body;
at least one roller comprised of at least two roller disks adjustably axially movable relative to each other within at least a limited range, each said roller disk having at least one circumferential ridge;
an axially reciprocating member reciprocally mounted within said body, said reciprocating member rotatably retaining said roller in fixed axial and circumferential position relative to said reciprocating member during powered operation of the fluid-power device with said roller in seated rolling engagement with said grooved surface portion for transmitting force between said reciprocating member and the one of said body or said drive member having said grooved surface portion, each of said ridges of said roller disks being positioned for rolling travel in a corresponding one of said helical grooves of said grooved surface portion;
means for transmitting torque between said reciprocating member and an other of said body or said drive member;
at least one piston mounted for reciprocal movement and operatively engaging said reciprocating member; and
adjustment means for selectively and adjustably axially moving one of said roller disks of said roller relative to an other within said limited range by an amount sufficient to eliminate backlash between said reciprocating member and said grooved surface portion as said piston moves from one axial direction to an other as said piston reciprocates while maintaining at least one or an other said roller disks in rolling engagement with said grooved surface as said piston moves in one axial direction and at least the other of said roller disks in rolling engagement with said grooved surface as said piston moves in the other axial direction.

9. The device of claim 8 wherein said reciprocating member includes a spindle extending to a position adjacent to said grooved surface portion, said spindle having said roller coaxially and rotatably retained thereon and retained against axial movement relative to said spindle during powered operation of the fluid-power device, said spindle being retained by said reciprocating member to prevent axial movement of said spindle relative to said reciprocating member during powered operation of the fluid-power device, said two roller disks which comprise said roller being axially spaced apart on said spindle by an adjustment space at least as large as said limited range, at least one of said two roller disks being axially movable through said adjustment space for axial movement of said movable roller disks relative to the other of said roller disk through said adjustment space to eliminate backlash by operation of said adjustment means.

10. The device of claim 9 wherein said two roller disks retained on said spindle each has a substantially coaxial roller bore therethrough rotatably receiving a correspondingly sized portion of said spindle, said movable roller disk being axially slidable on said spindle portion.

11. The device of claim 9 wherein said adjustment means includes an adjustment member disposed on said spindle spaced away from said reciprocating member with said roller positioned therebetween, said adjustment member being axially movable on said spindle in response to rotation of said spindle to apply axial force on said roller disks to move one or the other of said roller disks relative to the other within said limited range by an amount sufficient to eliminate backlash, said spindle being selectively and adjustably rotatable to axially move said adjustment member.

12. The device of claim 8 wherein said at least one roller includes a plurality of rollers each comprised of said at least two roller disks with each ridge thereof being positioned for rolling travel in one of said helical grooves, and wherein said reciprocating member includes a plurality of spindles extending into a circumferential space adjacent to said grooved surface portion and circumferentially distributed thereabout, said spindles each having at least one of said rollers coaxially and rotatably retained thereon and retained against axial movement relative to said spindles during powered operation of the fluid-power device, said spindles being retained by said reciprocating member to prevent axial movement of said spindles relative to said reciprocating member during powered operation of the fluid-power device, said two roller disks which comprise each of said rollers being axially spaced apart on said spindle on which retained by an adjustment space at least as large as said limited range, at least one of said two roller disks being axially movable through said adjustment space for selective axial movement of said movable roller disks relative to the other of said two roller disks through said adjustment space to eliminate backlash by operation of said adjustment means.

13. The device of claim 12 wherein said two roller disks retained on each of said spindles each has a substantially coaxial roller bore therethrough rotatably receiving a correspondingly sized portion of one of said spindles, said movable roller disk being axially slidable on said spindle portion.

14. The device of claim 12 wherein said adjustment means includes engagement means disposed on said spindles and spaced away from said reciprocating member with said rollers positioned therebetween for applying axial force on said roller disks of said rollers to move one or the other of said roller disks of each said roller relative to the other within said limited range by an amount sufficient to eliminate backlash.

15. The device of claim 14 wherein said engagement means operates to apply said axial force in response to rotation of said spindle, and said spindles are selectively and adjustably rotatable.

16. The device of claim 15 wherein said engagement means includes an engagement member axially movable on said spindles in response to rotation of said spindles to apply said axial force of said roller disks.

17. The device of claim 12 wherein said spindles each have a free, unattached first end portion extending into a circumferential space adjacent to said grooved surface portion and circumferentially distributed thereabout, said spindle free end portions each having at least one of said rollers coaxially and rotatably retained thereon and retained against axial movement relative to said spindles during powered operation of the fluid-power device, each said spindle having a second end portion attached to said reciprocating member to support said first end portion in cantilevered manner and to prevent axial and circumferential movement of said spindle, said reciprocating member retaining said spindle free first end portions and said rollers rotatable retained thereon in fixed axial and circumferential position relative to said reciprocating member during powered operation of the fluid-power device, said rollers on said spindles being retained by said reciprocating member in circumferentially distributed arrangement.

18. The device of claim 17 wherein said adjustment means includes a spindle support plate having a plurality of circumferentially distributed spindle openings, each said spindle opening receiving one of said spindle free first end portions therethrough and providing support thereto against lateral forces on said spindles, said support plate being attached to said spindles for travel therewith during powered operation of the fluid-power device.

19. The device of claim 18 wherein said spindle support plate is annular with a central opening through which said drive member extends, and said spindle openings are circumferentially distributed about said plate central opening.

20. The device of claim 17 wherein said reciprocating member has a plurality of circumferentially spaced apart bore holes extending fully therethrough, said spindle second end portions being disposed in said bore holes.

21. The device of claim 20 wherein said spindle second end portions are rotatably disposed in said bore holes in said reciprocating member for selective adjustable rotation thereof, said adjustment means eliminating backlash in response to rotation of said spindle second end portions.

22. A fluid-power device, comprising:
a body having a plurality of helical grooves formed on a radially inward facing surface portion thereof;
an axially extending drive member supported for movement relative to said body and connectable to an external device, said drive member having a plurality of helical grooves formed on a radially outward facing surface portion thereof disposed within said body and confronting said grooved body inward surface portion, said grooved body surface portion and said grooved drive member surface portion defining a circumferential space therebetween, said drive member helical grooves having a hand turn opposite the hand turn of said body helical grooves and having substantially the same axial pitch as said body helical grooves;
a plurality of rollers disposed in said circumferential space, each of said rollers being comprised of at least two roller disks adjustably axially movable relative to each other within at least a limited range, each said roller disk having at least one circumferential ridge, said roller disk ridges of each said rollers having an axial pitch corresponding to the axial pitch of said body and member helical grooves;
an axially reciprocating member reciprocally mounted within said body, said reciprocating member rotatably retaining said rollers in fixed axial and circumferential position relative to said reciprocating member during powered operation of the fluid-power device, said reciprocating member further retaining said rollers in circumferentially distributed positions in said circumferential space with each of said rollers having said roller disk ridges thereof in seated rolling engagement with both said grooved body surface portion and said grooved drive member surface portion for transmitting force between said body, drive member and reciprocating member, said roller disk ridges of said rollers being positioned for rolling travel in corresponding grooves of said body and said drive member;

at least one piston mounted for reciprocal movement and operatively engaging said reciprocating member; and adjustment means for selectively and adjustably axially moving one or the other of said roller disks of each of said rollers relative to the other within said limited range by an amount sufficient to eliminate backlash between said reciprocating member and said grooved body and drive member surface portions as said piston moves from one axial direction to an other as said piston reciprocates.

23. The device of claim 22 wherein said reciprocating member includes a plurality of spindles extending into said circumferential space and circumferentially distributed thereabout, said spindles each having at least one of said rollers coaxially and rotatably retained thereon and retained against axial movement relative to said spindles during powered operation of the fluid-power device, said spindles being retained by said reciprocating member to prevent axial movement of said spindles relative to said reciprocating member during powered operation of the fluid-power device, said two roller disks which comprise each of said rollers being axially spaced apart on said spindle on which retained by an adjustment space at least as large as said limited range, at least one of said two roller disks being axially movable through said adjustment space for selective axial movement of said movable roller disks relative to the other of said two roller disks through said adjustment space to eliminate backlash by operation of said adjustment means.

24. The device of claim 23 wherein said two roller disks retained on each of said spindles each has a substantially coaxial roller bore therethrough rotatably receiving a correspondingly sized portion of one of said spindles, said movable roller disk being axially slidable on said spindle portion independent of the other of said roller disks.

25. The device of claim 23 wherein said adjustment means includes engagement means disposed on said spindles and spaced away from said reciprocating member with said rollers positioned therebetween for applying axial force on said roller disks of said rollers to move one or the other of said roller disks of each said roller relative to the other within said limited range by an amount sufficient to eliminate backlash.

26. The device of claim 25 wherein said engagement means operates to apply said axial force in response to rotation of said spindle, and said spindles are selectively and adjustably rotatable.

27. The device of claim 26 wherein said engagement means includes an engagement member axially movable on said spindles in response to rotation of said spindles to apply said axial force of said roller disks.

28. The device of claim 23 wherein said spindles each have a free, unattached first end portion extending into a circumferential space adjacent to said grooved surface portion and circumferentially distributed thereabout, said spindle free end portions each having at least one of said rollers coaxially and rotatably retained thereon and retained against axial movement relative to said spindles during powered operation of the device, each said spindle having a second end portion attached to said reciprocating member to support said first end portion in cantilevered manner and to prevent axial and circumferential movement of said spindle, said reciprocating member retaining said spindle free first end portions and said rollers rotatable retained thereon in fixed axial and circumferential position relative to said reciprocating member during powered operation of the fluid-power device, said rollers on said spindles being retained by said reciprocating member in circumferentially distributed arrangement.

29. The device of claim 28 wherein said adjustment means includes a spindle support plate having a plurality of circumferentially distributed spindle openings, each said spindle opening receiving one of said spindle free first end portions therethrough and providing support thereto against lateral forces on said spindles, said support plate being attached to said spindles for travel therewith during powered operation of the fluid-power device.

30. The device of claim 29 wherein said spindle support plate is annular with a central opening through which said drive member extends, and said spindle openings are circumferentially distributed about said plate central opening.

31. The device of claim 28 wherein said reciprocating member has a plurality of circumferentially spaced apart bore holes extending fully therethrough, said spindle second end portions being disposed in said bore holes.

32. The device of claim 31 wherein said spindle second end portions are rotatably disposed in said bore holes for selective adjustable rotation thereof, said adjustment means eliminating backlash in response to rotation of said spindle second end portions.

33. The device of claim 32 wherein said spindle first end portions are positioned to a first axial end of said reciprocating member and said spindle second end portions extend fully through said bore holes and have a spindle head portion positioned on a second axial end of said reciprocating member, said spindle head portion permitting selective adjustable rotation of said spindles but preventing axial movement of said spindle toward said rollers relative to said reciprocating member, said spindle first end portions having a threaded end portion, and wherein said adjustment means includes a spindle support plate having a plurality of circumferentially distributed spindle receiving openings threaded to correspond to said spindle threaded end portions, each said spindle receiving opening threadably receiving one of said threaded end portions of said spindle free first end portions therethrough and providing support thereto against lateral forces on said spindles, said support plate being attached to said spindles for travel therewith during powered operation of the fluid-power device, selective adjustable rotation of said spindles axially moving said spindle support plate axially relative to said spindles and applying axial force on said spindle roller disks to move one or the other of said roller disks of each roller relative to the other within said limited range by an amount sufficient to eliminate backlash.

34. The device of claim 28 wherein said reciprocating member has a plurality of circumferentially spaced apart bore holes and said spindle second end portions are rotatably disposed in said reciprocating member bore holes, and wherein the device further includes means for permitting selective adjustable rotation of said spindle second end portions in said reciprocating member bore holes to eliminate backlash while preventing axial movement of said spindles toward said rollers relative to said reciprocating member, said spindle first end portions having a threaded end portion, and wherein said adjustment means includes an independently and adjustably axially movable spindle support plate having a plurality of circumferentially distributed spindle receiving openings threaded to correspond to said threaded end portions, each said spindle receiving openings threadably receiving one of said threaded end portions of said spindle free first end portions therethrough and providing support thereto against lateral forces on said spindles, said support plate being attached to said spindles for travel therewith during powered operation of the fluid-power device, selective adjustable rotation of said spindles axially moving said spindle support plate axially relative to said spindles and applying axial force on said spindle roller disks to move one or the other of said roller disks of each said roller relative to the other within said limited range by an amount sufficient to eliminate backlash.

* * * * *